United States Patent
Zhang et al.

(10) Patent No.: US 11,091,816 B2
(45) Date of Patent: Aug. 17, 2021

(54) METHOD FOR IRONMAKING BY SMELTING REDUCTION IN STIR-GENERATED VORTEX

(71) Applicant: Northeastern University, Shenyang (CN)

(72) Inventors: Ting an Zhang, Shenyang (CN); Yan Liu, Shenyang (CN); Zhi he Dou, Shenyang (CN); Zi mu Zhang, Shenyang (CN); Guo zhi Lv, Shenyang (CN)

(73) Assignee: NORTHEASTERN UNIVERSITY, Shenyang (CN)

( * ) Notice: Subject to any disclaimer, the term of this patent is extended or adjusted under 35 U.S.C. 154(b) by 407 days.

(21) Appl. No.: 16/318,020

(22) PCT Filed: Apr. 28, 2017

(86) PCT No.: PCT/CN2017/082308
§ 371 (c)(1),
(2) Date: Jan. 15, 2019

(87) PCT Pub. No.: WO2018/058951
PCT Pub. Date: Apr. 5, 2018

(65) Prior Publication Data
US 2019/0230746 A1    Jul. 25, 2019

(30) Foreign Application Priority Data
Sep. 27, 2016    (CN) .......................... 201610854514.2

(51) Int. Cl.
*C21B 11/10*    (2006.01)
*H05B 6/06*    (2006.01)
(Continued)

(52) U.S. Cl.
CPC ................ *C21B 11/10* (2013.01); *C21C 1/04* (2013.01); *H05B 6/067* (2013.01); *H05B 6/34* (2013.01);
(Continued)

(58) Field of Classification Search
CPC .......... H05B 6/067; H05B 6/34; H05B 6/367; F27D 2027/002; F27D 2003/0083
See application file for complete search history.

(56) References Cited

U.S. PATENT DOCUMENTS 3,251,681 A * 5/1966 Ban .......................... F27D 27/00
                                                                75/560
3,861,660 A * 1/1975 Ammann ................ C22B 34/34
                                                                266/235
(Continued)

FOREIGN PATENT DOCUMENTS

CN    1095108 A    11/1994
CN    1147017 A    4/1997
(Continued)

*Primary Examiner* — Anthony J Zimmer
*Assistant Examiner* — Dean Mazzola
(74) *Attorney, Agent, or Firm* — Muncy, Geissler, Olds & Lowe, P.C.

(57) ABSTRACT

A method for ironmaking by smelting reduction in a stir-generated vortex includes: (1) placing a pig iron in an induction furnace, and then heating the pig iron to a molten state to form a molten iron, and maintaining the molten iron to be greater than or equal to 1450° C.; (2) stirring a center of the molten iron to form a vortex with a height-to-diameter ratio of 0.5-2.5, and continuously performing stirring; (3) mixing and grinding on an iron-containing mineral, a reducing agent and a slag-forming agent in a mass ratio of 1:(0.1-0.15):(0.25-0.4) to obtain a powder mixture, spraying and blowing the powder mixture to a center of the vortex, performing a reduction reaction, and stopping the stirring after the molten iron and molten slags are obtained, wherein (Continued)

a waste gas is produced; and (4) discharging the molten iron and the molten slags respectively, and exhausting a treated waste gas.

9 Claims, 1 Drawing Sheet

(51) Int. Cl.
*H05B 6/36* (2006.01)
*H05B 6/34* (2006.01)
*C21C 1/04* (2006.01)

(52) U.S. Cl.
CPC .......... *H05B 6/367* (2013.01); *C21B 2300/02* (2013.01)

(56) References Cited

U.S. PATENT DOCUMENTS

| | | | | |
|---|---|---|---|---|
| 5,891,214 | A * | 4/1999 | Innes | C21B 13/0013 75/502 |
| 6,693,947 | B1 * | 2/2004 | Schroeder | C21C 5/5229 266/44 |
| 2005/0257644 | A1 * | 11/2005 | Nakai | C21C 1/025 75/315 |
| 2009/0311154 | A1 | 12/2009 | Jha et al. | |
| 2010/0229685 | A1 * | 9/2010 | Fujimoto | C21C 5/36 75/467 |
| 2011/0011209 | A1 * | 1/2011 | Tateishi | C21C 5/35 75/375 |
| 2016/0053762 | A1 * | 2/2016 | Cooper | F04D 7/065 416/170 R |

FOREIGN PATENT DOCUMENTS

| | | | |
|---|---|---|---|
| CN | 101348842 A | * | 1/2009 |
| CN | 102268514 A | | 12/2011 |
| CN | 102643945 A | | 8/2012 |
| CN | 102146493 B | * | 5/2013 |
| CN | 103740873 A | | 4/2014 |
| CN | 105567988 A | * | 5/2016 |
| CN | 106435080 A | | 2/2017 |
| JP | 2008537702 A | | 9/2008 |

* cited by examiner

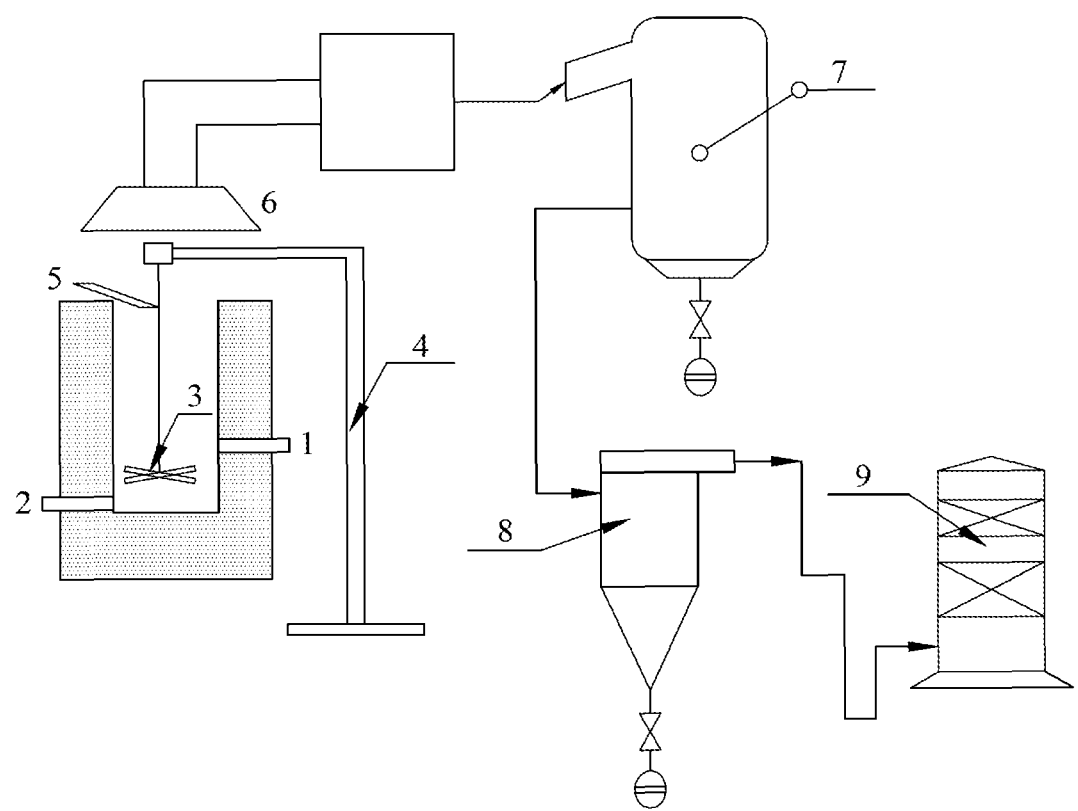

METHOD FOR IRONMAKING BY SMELTING REDUCTION IN STIR-GENERATED VORTEX

BACKGROUND OF THE INVENTION

1. Field of the Invention

The present invention belongs to the field of metallurgical technology, and particularly relates to a method for ironmaking by smelting reduction in a stir-generated vortex.

2. The Prior Arts

China's steel industry has grown rapidly over years of high-speed development, accounting for 40% or above of global steel production capacity. However, reducing cost and improving working environment have become top priorities in the face of steel overcapacity and increasingly-strict environmental requirements. As the basis of steelmaking, an ironmaking process is perfect. In China, ironmaking mainly refers to blast-furnace ironmaking. The blast-furnace ironmaking is mainly a reduction process of iron, that is, iron in ore for ironmaking is reduced from oxides to molten pig iron at high temperatures by using coke as fuel and reducing agents.

Under harsh economic situations, ironworks take various measures to continue reducing pig iron processing cost. Requirements for blast-furnace operating indicators mainly focus on raising the air temperature of the blast furnace, increasing the gas utilization rate, reducing the fuel ratio and prolonging the service life of the blast furnace. As the mature blast-furnace ironmaking process has made ironmaking cost to be stable, improvements on local conditions can only change pig iron cost to a small extent, producing a small profit margin.

In the blast-furnace production process, the utilization rate of the reducing agent has a great effect on production cost, the duration of the production cycle is an important factor influencing the price of molten iron, the utilization rate of the reducing agent can be effectively increased, the production cycle can be shortened, the pig iron cost can be reduced, and further the entire steelmaking cost is influenced. Traditional blast-furnace ironmaking mainly adopts anthracite dust as the reducing agent, wherein the anthracite dust is sprayed and blown from the tuyere into the blast furnace. The low density of pulverized coal enables a large amount of pulverized coal to float on the surface in the reaction process, so that the pulverized coal cannot react well with iron oxides and the utilization rate of the pulverized coal is low; and a lot of unreacted dust exists in produced flue gas, so that raw materials are wasted, and atmosphere and environment on site can also be badly influenced.

Therefore, it is very essential to find a new adding manner to increase the utilization rate of the reducing agent, shorten the reaction cycle and improve the environment on site. A KR stirring method is mainly used for mixing a desulfurizer with molten iron for promoting desulfurization at the molten iron pretreatment stage of the steelmaking process. The KR stirring paddle is used for stirring drawn pulverized coal in the ironmaking process, so that the utilization rate of the reducing agent can be greatly reduced.

Chinese patent application No. 201210104356.0 provides a novel KR desulphurization stirring method, and relates to desulfurization outside a molten iron furnace in front of a converter. Through the rotary stirring of a stirrer, the desulfurizer on the molten iron surface is drawn into the molten iron for mixed desulfurization. However, the invention does not relate to the field of ironmaking. Chinese patent application No. 201110185831.7 provides a KR desulfurization slag iron recycling method, slag iron after KR desulfurization is recycled for steelmaking. However, the invention does not relate to the field of ironmaking. Chinese patent application No. 201410040360.4 provides an improved blast-furnace ironmaking system. Under the condition that the hot air conveying temperature of blast-furnace ironmaking is guaranteed to be effectively raised, the configuration scale of an air heating furnace is decreased, the occupied area is saved, the investment is reduced, and the unit energy consumption and cost of ironmaking are reduced. However, the invention does not relate to a stirring ironmaking system.

SUMMARY OF THE INVENTION

In accordance with defects of an adding manner and low utilization rate of a reducing agent in a blast furnace, the present invention provides a method for ironmaking by smelting reduction in a stir-generated vortex. The method according to the present invention adopts an induction furnace with a stirring paddle, and a center stirring manner is used for rotatably stirring melt to form a vortex. After being added to a center of the vortex, the pulverized iron-containing raw material, the reducing agent and the slag-forming agent are immediately drawn into a smelting pool to be mixed thoroughly and react, so that iron-containing oxides are rapidly reduced.

In order to realize the above purpose, the present invention adopts the following technical solution:

The method for ironmaking by smelting reduction in a stir-generated vortex comprises the following steps:

(1) Placing a pig iron in an induction furnace, heating the pig iron to a molten state to form a molten iron, and maintaining a temperature of the molten iron to be greater than or equal to 1,450° C., wherein an amount of the pig iron is 5-20 vol % of an induction furnace body;

(2) Stirring the molten iron to form a vortex with a height-to-diameter ratio of 0.5-2.5, and continuously performing stirring;

(3) Spraying and blowing a mixture of an iron-containing mineral, a reducing agent and a slag-forming agent to a center of the vortex to cause a reduction reaction, and stopping stirring after the molten iron and molten slags are obtained and a waste gas is produced, wherein a mass ratio of the iron-containing mineral, the reducing agent, and the slag-forming agent is 1:(0.1-0.15):(0.25-0.4); and (4) Discharging the molten iron and the molten slags respectively, and exhausting a treated waste gas.

In the step (1), the molten iron is used for providing heating environment.

In the step (1), the method of maintaining the temperature of the molten iron to be greater than or equal to 1,450° C. is realized by self-heating of the induction furnace.

In the step (1), the induction furnace comprises a slag discharge opening and a molten iron discharge opening; the molten iron discharge opening is formed in a lower part on one side of the induction furnace, and the slag discharge opening is formed in an upper part on the other side of the induction furnace;

The induction furnace is provided with a stirring paddle, a stirring paddle lifting system, a powder spraying device, an air hood, a flue gas purifying system, a waste heat recovery system, and a washing tower, wherein the stirring paddle is arranged in the induction furnace, the stirring paddle lifting system is connected with the stirring paddle, the powder spraying device is arranged at a top on one side of the induction furnace, the air hood is arranged above the induction furnace, an inlet of the flue gas purifying system is connected with the air hood through a pipeline, an inlet of the waste heat recovery system is connected with an outlet of the flue gas purifying system through a pipeline, an inlet of the washing tower is connected with an outlet of the waste heat recovery system through a pipeline, an outlet of the washing tower communicates with atmosphere, and the stirring paddle lifting system is used for replacing the stirring paddle.

The stirring paddle is made from a carbon material.

The stirring paddle is a graphite stirring paddle.

In the step (2), the stirring paddle is inserted to ⅓-½ of a liquid level of the molten iron for a center stirring at a center stirring speed of 50-200 r/min.

In the step (3), the iron-containing mineral, the reducing agent and the slag-forming agent are mixed, ground, and then sprayed and blown to the center of the vortex through a powder spraying device.

In the step (3), the iron-containing mineral is iron ore.

In the step (3), the reducing agent is pulverized coal.

In the step (3), the slag-forming agent is calcium oxide.

In the step (3), a reduction rate of the iron-containing mineral is greater than or equal to 95.5%, and an iron content in molten slags are less than or equal to 0.35% by mass.

In the step (3), the molten slags comprise the following components of $CaO$, $SiO_2$ and $Al_2O_3$.

In the step (4), the molten slags are placed in an upper layer and the molten iron is placed in a lower layer in the induction furnace, wherein the molten slags are discharged from the slag discharge opening and the molten iron is discharged from the molten iron discharge opening.

In the step (4), the waste gas is conveyed to the flue gas purifying system via the air hood for purification, a waste heat is then recovered through the waste heat recovery system, a harmful gas in the waste gas is absorbed through the washing tower, and a resultant gas is discharged into the atmosphere once relevant emission requirements are met.

The main reactions in the reduction iron-making process are as follows:

$$Fe_xO_y + yC = yCO + xFe$$

$$Fe_xO_y + yCO = yCO_2 + xFe$$

$$Fe_xO_y + y/2C = y/2CO_2 + xFe$$

The method has the beneficial effects that:

(1) After being directly added to the stir-generated vortex center on the surface of the melt, reaction materials, namely the iron-containing mineral, the reducing agent and the slag-forming agent, are immediately drawn into the smelting pool. The drawn-in reaction materials can achieve full contact after being stirred, reaction is accelerated and the ironmaking period is shortened.

(2) The mechanical stirring paddle is made from the carbon material. After being broken due to stirring, the stirring paddle can be smashed for reuse as the reducing agent.

(3) The method is simple in process, low in investment, energy-saving, environmental-friendly, and low in cost, and has high economic value. The utilization rate of the reducing agent is greatly increased, and the method is an efficient non-blast-furnace iron-making technology.

(4) According to the method, the reduction rate of the iron-containing mineral is greater than or equal to 95.5%, and iron content in molten slags are less than or equal to 0.35%.

BRIEF DESCRIPTION OF THE DRAWINGS

The sole FIGURE shows a schematically structural diagram of the induction furnace system of the present invention, wherein: 1 indicates slag discharge opening, 2 indicates molten iron discharge opening, 3 indicates graphite stirring paddle, 4 indicates stirring paddle lifting system, 5 indicates powder spraying device, 6 indicates air hood, 7 indicates flue gas purifying system, 8 indicates waste heat recovery system, 9 indicates washing tower.

DETAILED DESCRIPTION OF THE PREFERRED EMBODIMENT

The present invention will be further detailed below in combination with embodiments.

Embodiment 1

The structural diagram of the induction furnace system of the embodiment refers to the sole FIGURE.

The method for ironmaking by smelting reduction in a stir-generated vortex comprises the following steps:

(1) Placing a pig iron in an induction furnace, heating the pig iron to a molten state to form a molten iron, and maintaining a temperature of the molten iron to be greater than or equal to 1,450° C. for providing heating environment, wherein an amount of the pig iron is 5 vol % of an induction furnace body;

(2) Inserting a graphite stirring paddle 3 to ⅓ of a liquid level of the molten iron for a center stirring at a stirring speed of 50 r/min, so that a vortex with a height-to-diameter ratio of 0.5 is formed, and the stirring is continued;

Replacing the stirring paddle 3 through a stirring paddle lifting system 4 according to a degree of wear of the graphite stirring paddle 3, and smashing the worn graphite stirring paddle 3 for reuse as a reducing agent;

(3) Performing mixing and grinding on an iron ore, a pulverized coal and a calcium oxide in a mass ratio of the iron ore to the pulverized coal to the calcium oxide being 1:0.1:0.25 to obtain a powder mixture, spraying and blowing the power mixture to a center of the vortex, performing a reduction reaction, and stopping the stirring after the molten iron and molten slags are obtained, wherein a waste gas is produced;

(4) In the induction furnace, placing the molten iron in a lower layer and the molten slags in an upper layer, wherein the molten slags mainly comprise $CaO$, $SiO_2$ and $Al_2O_3$; discharging the lower-layer molten iron through a molten iron discharging opening 2, and discharging the upper-layer molten slags through a slag discharging opening 1, wherein a reduction rate of the iron ore is 96.5%, and the molten slags contain 0.3% of iron; conveying the waste gas produced during the reaction to a flue gas purifying system 7 via an air hood 6 for purification, then recovering waste heat through a waste heat recovery system 8, absorbing harmful gas in the waste gas through a washing tower 9, and discharging a resultant gas into an atmosphere once relevant emission requirements are met.

Embodiment 2

The structural diagram of the induction furnace system of the embodiment refers to the sole FIGURE.

The method for ironmaking by smelting reduction in a stir-generated vortex comprises the following steps:

(1) Placing a pig iron in an induction furnace, heating the pig iron to a molten state to form a molten iron, and maintaining a temperature of the molten iron to be greater than or equal to 1,550° C. for providing heating environment, wherein an amount of the pig iron is 15 vol % of an induction furnace body;

(2) Inserting a graphite stirring paddle 3 to ½ of a liquid level of the molten iron for a center stirring at a stirring speed of 200 r/min, so that a vortex with a height-to-diameter ratio of 2.5 is formed, and the stirring is continued;

Replacing the stirring paddle 3 through a stirring paddle lifting system 4 according to a degree of wear of the graphite stirring paddle 3;

(3) Performing mixing and grinding on an iron ore, a pulverized coal and a calcium oxide in a mass ratio of the iron ore to the pulverized coal to the calcium oxide being 1:0.15:0.4 to obtain a powder mixture, spraying and blowing the power mixture to a center of the vortex, performing a reduction reaction, and stopping the stirring after the molten iron and molten slags are obtained, wherein a waste gas is produced; and (4) In the induction furnace, placing the molten iron in a lower layer and the molten slags in an upper layer, wherein the molten slags mainly comprise CaO, $SiO_2$ and $Al_2O_3$; discharging the lower-layer molten iron through a molten iron discharging opening 2, and discharging the upper-layer molten slags through a slag discharging opening 1, wherein a reduction rate of the iron ore is 95.5%, and the molten slags contain 0.35% of iron; conveying the waste gas produced during the reaction to a flue gas purifying system 7 via an air hood 6 for purification, then recovering waste heat through a waste heat recovery system 8, absorbing harmful gas in the waste gas through a washing tower 9, and discharging a resultant gas into an atmosphere once relevant emission requirements are met.

Embodiment 3

The structural diagram of the induction furnace system of the embodiment refers to the sole FIGURE.

The method for ironmaking by smelting reduction in a stir-generated vortex comprises the following steps:

(1) Placing a pig iron in an induction furnace, heating the pig iron to a molten state to form a molten iron, and maintaining a temperature of the molten iron to be greater than or equal to 1,500° C. for providing heating environment, wherein an amount of the pig iron is 20 vol % of an induction furnace body;

(2) Inserting a graphite stirring paddle 3 to ½ of a liquid level of the molten iron for a center stirring at a stirring speed of 100 r/min, so that a vortex with a height-to-diameter ratio of 1.0 is formed, and the stirring is continued;

Replacing the stirring paddle 3 through a stirring paddle lifting system 4 according to a degree of wear of the graphite stirring paddle 3;

(3) Performing mixing and grinding on an iron ore, a pulverized coal and a calcium oxide in a mass ratio of the iron ore to the pulverized coal to the calcium oxide being 1:0.12:0.3 to obtain a powder mixture, spraying and blowing the power mixture to a center of the vortex, performing a reduction reaction, and stopping the stirring after the molten iron and molten slags are obtained, wherein a waste gas is produced; and (4) In the induction furnace, placing the molten iron in a lower layer and the molten slags in an upper layer, wherein the molten slags mainly comprise CaO, $SiO_2$ and $Al_2O_3$; discharging the lower-layer molten iron through a molten iron discharging opening 2, and discharging the upper-layer molten slags through a slag discharging opening 1, wherein a reduction rate of the iron ore is 96.2%, and a molten slags contain 0.32% of iron; conveying the waste gas produced during the reaction to a flue gas purifying system 7 via an air hood 6 for purification, then recovering waste heat through a waste heat recovery system 8, absorbing harmful gas in the waste gas through a washing tower 9, and discharging a resultant gas into an atmosphere once relevant emission requirements are met.

Embodiment 4

The structural diagram of the induction furnace system of the embodiment refers to the sole FIGURE.

The method for ironmaking by smelting reduction in a stir-generated vortex comprises the following steps:

(1) Placing a pig iron in an induction furnace, heating the pig iron to a molten state to form a molten iron, and maintaining a temperature of the molten iron to be greater than or equal to 1,480° C. for providing heating environment, wherein an amount of the pig iron is 10 vol % of an induction furnace body;

(2) Inserting a graphite stirring paddle 3 to ⅓ of a liquid level of the molten iron for a center stirring at a stirring speed of 150 r/min, so that a vortex with a height-to-diameter ratio of 1.5 is formed, and the stirring is continued;

Replacing the stirring paddle 3 through a stirring paddle lifting system 4 according to a degree of wear of the graphite stirring paddle 3;

(3) Performing mixing and grinding on an iron ore, a pulverized coal and a calcium oxide in a mass ratio of the iron ore to the pulverized coal to the calcium oxide being 1:0.14:0.35 to obtain a powder mixture, spraying and blowing the power mixture to a center of the vortex, performing a reduction reaction, and stopping the stirring after the molten iron and molten slags are obtained, wherein a waste gas is produced; and (4) In the induction furnace, placing the molten iron in a lower layer and the molten slags in an upper layer, wherein the molten slags mainly comprise CaO, $SiO_2$ and $Al_2O_3$; discharging the lower-layer molten iron through a molten iron discharging opening 2, and discharging the upper-layer molten slags through a slag discharging opening 1, wherein a reduction rate of the iron ore is 95.8%, and a molten slags contain 0.33% of iron; conveying the waste gas produced during the reaction to a flue gas purifying system 7 via an air hood 6 for purification, then recovering waste heat through a waste heat recovery system 8, absorbing harmful gas in the waste gas through a washing tower 9, and discharging a resultant gas into an atmosphere once relevant emission requirements are met.

What is claimed is:

1. A method for ironmaking by smelting reduction in a stir-generated vortex, comprising:
   (1) placing a pig iron in an induction furnace, heating the pig iron to a molten state to form a molten iron, and maintaining a temperature of the molten iron to be greater than or equal to 1,450° C., wherein an amount of the pig iron is 5-20 vol % of an induction furnace body;
   (2) stirring the molten iron to form a vortex with a height-to-diameter ratio of 0.5-2.5, and continuously performing stirring;

(3) spraying and blowing a mixture of an iron-containing mineral, a reducing agent and a slag-forming agent to a center of the vortex to cause a reduction reaction, and stopping stirring after molten iron and molten slags are obtained and a waste gas is produced, wherein a mass ratio of the iron-containing mineral, the reducing agent, and the slag-forming agent is 1:(0.1-0.15):(0.25-0.4); and (4) discharging the molten iron and the molten slags respectively, and exhausting a treated waste gas.

2. The method according to claim 1, wherein in the step (1), the induction furnace comprises a slag discharge opening and a molten iron discharge opening; the molten iron discharge opening is formed in a lower part on one side of the induction furnace, and the slag discharge opening is formed in an upper part on the other side of the induction furnace;

the induction furnace is provided with a stirring paddle, a stirring paddle lifting system, a powder spraying device, an air hood, a flue gas purifying system, a waste heat recovery system, and a washing tower, wherein the stirring paddle is arranged in the induction furnace, the stirring paddle lifting system is connected with the stirring paddle, the powder spraying device is arranged at a top on one side of the induction furnace, the air hood is arranged above the induction furnace, an inlet of the flue gas purifying system is connected with the air hood through a pipeline, an inlet of the waste heat recovery system is connected with an outlet of the flue gas purifying system through a pipeline, an inlet of the washing tower is connected with an outlet of the waste heat recovery system through a pipeline, an outlet of the washing tower communicates with atmosphere, and the stirring paddle lifting system is used for replacing the stirring paddle.

3. The method according to claim 2, wherein the stirring paddle is a graphite stirring paddle.

4. The method according to claim 2, wherein in the step (2), the stirring paddle is inserted to ⅓-½ of a liquid level of the molten iron for a center stirring with a center stirring speed of 50-200 r/min.

5. The method according to claim 1, wherein in the step (3), the iron-containing mineral, the reducing agent and the slag-forming agent are mixed, ground, and then sprayed and blown to the center of the vortex through a powder spraying device.

6. The method according to claim 1, wherein in the step (3), the iron-containing mineral is iron ore, the reducing agent is pulverized coal, and the slag-forming agent is calcium oxide.

7. The method according to claim 1, wherein in the step (3), a reduction rate of the iron-containing mineral is greater than or equal to 95.5%, and an iron content in the molten slags is less than or equal to 0.35% by mass.

8. The method according to claim 2, wherein in the step (4), the molten slags are placed in an upper layer and the molten iron is placed in a lower layer in the induction furnace, wherein the molten slags are discharged from the slag discharge opening and the molten iron is discharged from the molten iron discharge opening.

9. The method according to claim 2, wherein the step (4), the waste gas is conveyed to the flue gas purifying system via the air hood for purification, a waste heat is then recovered through the waste heat recovery system.

* * * * *